April 15, 1958 G. E. TENCH 2,830,846
SPRAY NOZZLE FOR PAN GREASING APPARATUS
Original Filed Aug. 7, 1950 3 Sheets-Sheet 2

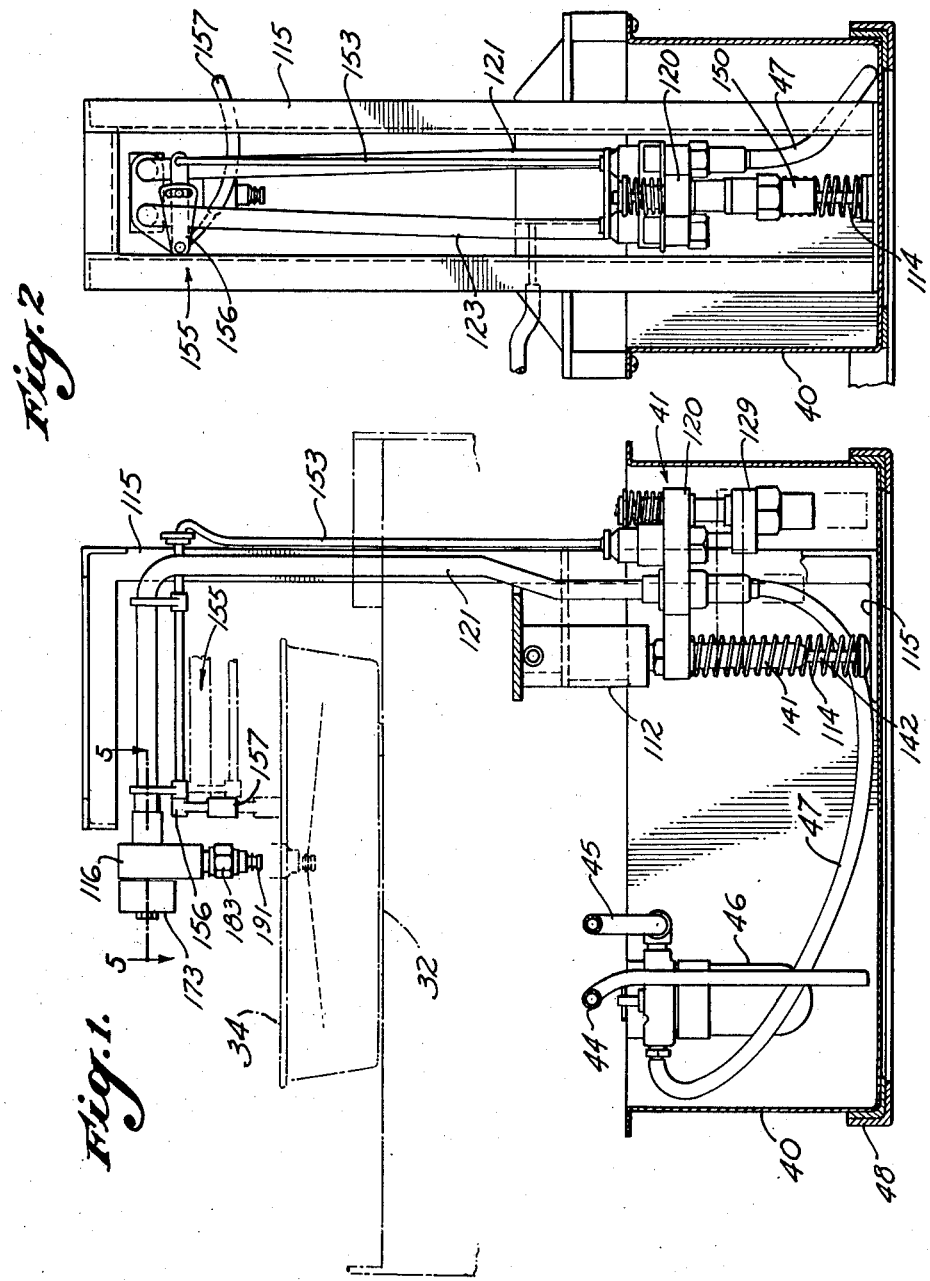

INVENTOR
GEORGE E. TENCH
BY HIS ATTORNEY
Otto Moeller

April 15, 1958      G. E. TENCH      2,830,846
SPRAY NOZZLE FOR PAN GREASING APPARATUS
Original Filed Aug. 7, 1950      3 Sheets-Sheet 3
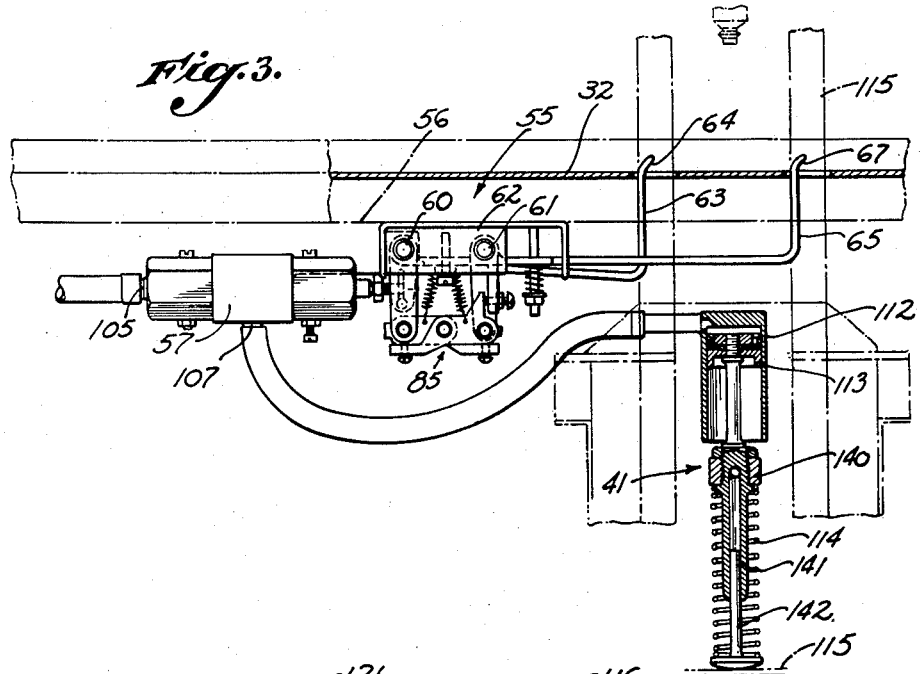
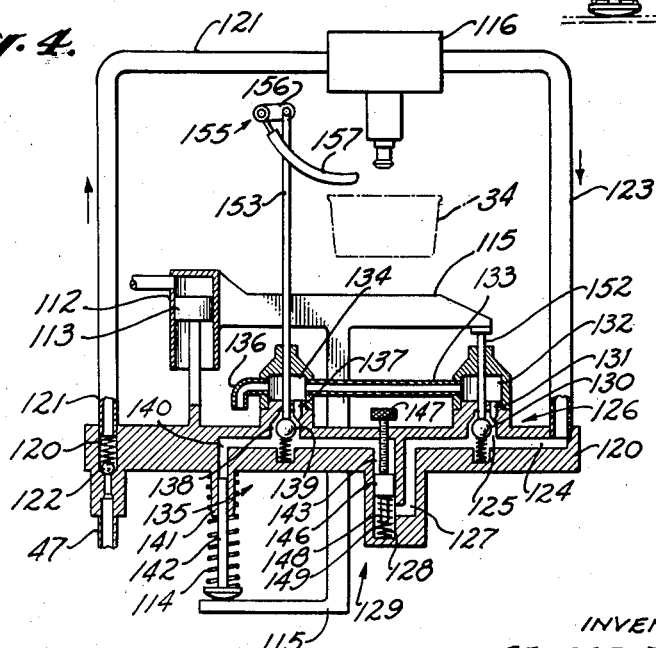
INVENTOR
GEORGE E. TENCH
BY HIS ATTORNEY United States Patent Office 2,830,846
Patented Apr. 15, 1958

2,830,846

SPRAY NOZZLE FOR PAN GREASING APPARATUS

George E. Tench, South Pasadena, Calif., assignor, by mesne assignments, to Capital Products Corporation, Mechanicsburg, Pa., a corporation of Pennsylvania Original application August 7, 1950, Serial No. 178,134, now Patent No. 2,701,134, dated February 8, 1955. Divided and this application December 8, 1954, Serial No. 473,831

2 Claims. (Cl. 299—123)

This application is a division of my co-pending application filed August 7, 1950, Serial No. 178,134, now Patent No. 2,701,542, granted February 8, 1955.

This invention relates to new and useful improvements in continuous duty automatic spraying equipment and deals more particularly with such apparatus for use in greasing the cavity of bread pans prior to the insertion of the dough to be baked.

Heretofore, bread pans have been greased manually, with manual aids, and with semiautomatic equipment that generally sprays the entire pan cavity. These procedures have become costly in manual labor, loss of time, and excessive use of grease and are unsuitable for present-day standards and demands of mass production of loaf bread.

It has been determined that the inner wall or walls and bottom surfaces of a bread pan need not be entirely sprayed with the grease to preclude adherence of the baked loaf to the pan, but it is sufficient to coat only a portion of the inner walls with a band of grease near the upper extremities thereof. This has resulted in a considerable saving in oil material and incidentally produces a product that is more appetizing in appearance due to the sparing amount of grease that is used, the band of grease applied still being sufficient to lubricate the pan walls.

The expansion of demands for bakery goods necessitates the application of mass production methods to their manufacture. At the present time, bread pans are not individually handled but are joined together by straps in any desired number and are commonly referred to as straps of pans. These integral units may be handled by a conveyor system and treated and loaded in sequences. It is an object of this invention to provide as one of these sequential operations an automatic greasing apparatus to apply a band of grease to the bread pans as they are progressively moved along the conveyor.

Briefly, the apparatus includes a belt to convey straps of pans, the pans passing beneath a movable grease distributor or nozzle whereby they are sprayed with grease in sequence. The nozzle is mounted upon a vertically movable carriage and is so actuated as to project a predetermined distance into the cavity of each pan as it passes, spray the pan with a band of grease, and then retract therefrom. The pan itself through actuating levers serves to initiate each of the above functions to accord proper timing as the pan passes the spraying station. It is, therefore, another object of this invention to provide a pan greasing apparatus that is actuated by the individual pans rendering the system entirely automatic.

It is another object to provide a carriage means to move the spray nozzle substantially into the cavity of each pan and withdraw the said nozzle after application of the spray.

Another object is to provide control means which includes a trigger mechanism operative to rapidly accelerate the spray nozzle carriage into operative position and to rapidly retract it therefrom.

Another object is to provide a nozzle with orifice characteristics suitable for applying a band of grease on the inner walls of the pan, said band being substantially uniform in width and quantity.

Another object is to provide adjustable means to control the amount of grease applied to each pan.

The invention also has for its objects to provide such means that are positive in operation, convenient in use, easily installed in working position and easily disconnected therefrom, economical of manufacture, relatively simple, and of general superiority and serviceability.

The invention also comprises novel details of construction and novel combinations and arrangements of parts, which will more fully appear in the course of the following description.

In the accompanying drawings:

Figure 1 is an enlarged side elevational view partly in section of the hydraulic unit and showing the nozzle carriage in its normal position and also showing the operative position in phantom;

Figure 2 is an end elevation of the hydraulic unit as seen in Figure 1;

Figure 3 is an enlarged side elevational view partly in section of the actuator unit showing the component parts thereof and its operative position with respect to the air valve and air plunger;

Figure 4 is a schematic representation of the details of the hydraulic unit;

Figure 8:
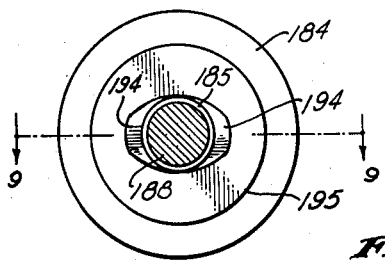
Figure 8 is an enlarged sectional bottom view of the nozzle taken along the line 8—8 of Figure 6.
Figure 5:
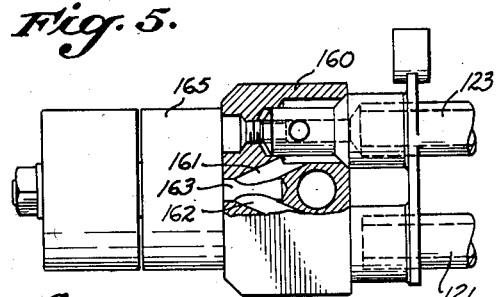
Figure 5 is an enlarged top view partly in section of the nozzle unit taken along the line 5—5 of Figure 1.
Figure 7:
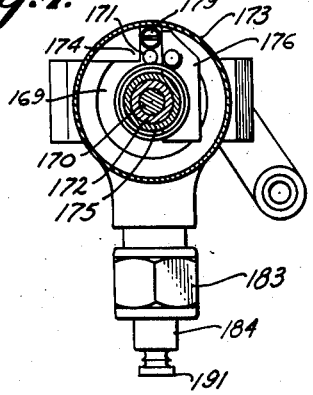
Figure 7 is a front elevational view of the nozzle taken along the line 7—7 of Figure 6.
Figure 6:
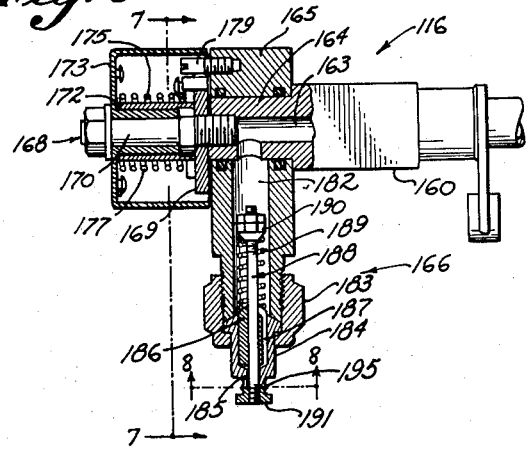
Figure 6 is a side elevational sectional view of the nozzle as seen in Figure 5.

The apparatus is entirely automatic, the individual pans by their movement along the conveyor belt serving to initiate and coordinate the operation. As the straps of pans approach the spraying station, a first control means or trip linkage mechanism, which includes two levers that extend in the path of the pan movement, is actuated as each pan passes thereby. The first control means is adapted to operate an air valve to provide air pressure to a cylinder that causes a hydraulic unit to slidably move downward toward the conveyor. Mounted on the hydraulic unit and integral therewith is a spray nozzle so disposed as to be projected into the cavity of the pan to be sprayed. When approaching the lowermost position, the hydraulic unit is actuated by a second control means which includes a trigger lever that engages with the upper rim of the pan and serves to release the grease from the nozzle to spray the inner walls of the pan. Progressive movement of the pan releases the first control means and permits the hydraulic unit to return to its uppermost and inoperative position as well as resets the mechanism for the next pan to be sprayed.

In Figures 1, 2 and 3 are illustrated the relative positions of the apparatus, wherein the belt 32 is provided for conducting the pans 34 beneath the spraying unit 116.

A tank or sump 40 for the grease or lubricant is located beneath the belt 32. The grease is drawn from the tank by suitable means, not shown through the lines or tubes 44, 45 to a strainer and relief valve 46, and then by a flexible inlet line 47 to a hydraulic unit 41 whereby the said unit is continuously supplied with fluid grease under a predetermined pressure and temperature.

Due to the high conveyor belt velocities desired in quantity production of bread, it is mandatory that the nozzle have rapid acceleration into and out of the spray position. First referring to Figure 3, the actuator unit is generally indicated by the numeral 55 and is rigidly attached to the under side of a frame table 56. An air valve 57 is mounted adjacent the actuator and operatively associated therewith, the actuator 55 functioning to create a rapid and positive motion to operate the air valve 57. The actuator comprises two parallel and freely rotatable shafts 60 and 61 that are longitudinally secured at their ends to a channel frame and brackets 62. A first lever 63 is rigidly pinned to the shaft 60 and extends upward of the channel frame 62 and through a port in the frame table 56. The lever 63 is provided with an inclined tip 64 for engagement with the leading edge of each pan. A second lever 65 is mounted on the shaft 61 and freely pivotal thereabout and extends in a similar manner, but in greater length, from the channel frame 62 through a port in the frame table 56. It is similarly provided with an inclined tip 67 for engagement with a pan.

Thus, as the pan traverses the table 56, the leading edge or side of the pan will depress the first lever 63 and then the second lever 65. Progressive movement of the pan will release the first lever 63 and then the second lever 65. As the first lever is depressed, the shaft 60 has imparted to it a slight rotational movement.

The outlet 107 of air valve 57 is connected to an air cylinder 112, as seen in Figure 3, whereby a piston 113 therein will depress under admitted air pressure against restraint of a compression spring 114. Release of the air to atmosphere at the air valve 57 will permit the spring 114 to drive the piston into its uppermost position. The air cylinder 112 is a part of the hydraulic unit 41 and initiates the movement thereof.

The hydraulic unit 41 is supported by and integral with the piston 113, both being vertically movable with respect to an overhead frame 115 and the air cylinder 112 attached thereto, as seen in Figure 1. The lower extremity of the unit is disposed within the grease tank 40 and extends upwardly and angularly outward and terminates at a nozzle unit 116 at a position directly over the conveyor belt 32. When the air cylinder 112 is supplied with pressure, the unit 41 will move downward, thus depressing the nozzle unit 116 into the cavity of the pan 34 as indicated in phantom.

As hereinbefore indicated, the grease is applied under regulated pressure through the inlet line 47 to the hydraulic unit 41. For purposes of clarity the hydraulic unit is shown schematically in Figure 4.

Referring to the schematic view and with incidental reference to the details, the hydraulic unit comprises a composite body 120 of interconnected fluid passages and fluid lines and is vertically movable in its entirety with respect to the frame 115, the normal and inoperative position thereof being up as shown. The grease inlet line 47 connects to the body 120 and to a line 121 having a ball check valve 122 therein. The line 121 extends upward to and through the nozzle unit 116 to a line 123 which extends downward and into the body 120 and a passage 124 to a chamber 125 having a circulation check unit 126. A passage 127 is in continuous connection with the chamber 125 and communicates it with a lower chamber 128 of a metering cylinder 129. The chamber 125 houses a circulation ball check valve 130 which is normally open and permits a flow of grease through a passage 131, an ante chamber 132, and a passage 133, into an ante chamber 134 of a depth check unit 135, and then through an exhaust passage 136 discharging the grease to the tank 40. Thus, there is provided an unimpeded circulation path for the heated grease whereby the hydraulic unit 41 may be maintained warm as well as permitting any air that may have found its way into the line to be bled therefrom.

The ante chamber 134 is connected through a passage 137 to a chamber 138 that houses a depth ball check valve 139 which is normally open to communicate the supply of grease through a passage 140 to a hydraulic cylinder 141 (see Figure 3) which has a plunger 142 slidable therein and is in firm spring-loaded abutment with the frame 115. The chamber 138 is also connected to an upper chamber 143 of the metering cylinder 129.

Intermediate and separating the chambers 128 and 143 of the metering cylinder 129 is a freely slidable plunger 146 that is normally urged into contact with an adjustable screw 147 by a compression spring 148 which thereby determines the height of the plunger within the cylinder. The plunger 146 is provided with a stem 149 extending into the lower chamber 128 and is of such length that when depressed into engagement with a cap 150 the plunger will not block the passage 127.

The circulation check device 126 is provided with a slidable rod 152 that operatively associates the frame 115 with the circulation ball check valve 130 by depressing said ball when the hydraulic unit is in the uppermost and inoperative position. The depth check unit 135 is provided with a slidable rod 153 that operatively associates the upper rim of the pan 34 with the depth ball check valve 139 when the hydraulic unit is in the lower and operative position. The rod 153 forms a part of a second control means or trigger linkage generally indicated by the numeral 155 and includes a bell crank 156 and an arcuate finger 157 for contacting the pan rim which are pivoted to the hydraulic unit structure to displace the rod 153. A preferred construction herein is to provide a predetermined amount of lost motion between the bell crank 156 and the rod 153 by means of a stud and slot to prevent the torque of the bell crank 156 and finger 157 when released from appearing as an increased force on the ball check valve 139.

The foregoing is the subject matter of my co-pending application Serial No. 178,134 above referred to.

The nozzle unit 116 is shown in Figures 5 to 9, being a component of the hydraulic unit 41, and moves in concert therewith to depress the grease emitting extremity into the cavity of the pan. As hereinbefore indicated, the grease is circulated through the nozzle unit by means of the lines 121 and 123. These lines are connected into a stationary body 160 having symmetrical passages 161 and 162 therein connected by a center passage 163 that also extends axially through a cylindrical extension 164 of the said body 160. Slidably receivable over the said extension 164 and pivoted thereto is a housing 165 that contains the nozzle valve as generally indicated by the numeral 166. The housing 165 is normally restrained in a substantially vertical position by spring loading but is rendered pivotal to prevent damage in the event of inadvertent disturbance of the synchronism of the system. Thus, if a moving pan strikes the side of the housing, it is free to pivot to preclude breakage thereof.

The spring loading unit generally indicated by the numeral 168, includes a plate 169 and a partially threaded shaft 170 that is firmly mounted in the extension 164, the plate 169 having an eccentric stop stud 171 extending therefrom for centrally locating the housing 165. A central tube 172 of a cap 173 is axially pivotal about the shaft 170, the cap having a boss 174 for engagement with the stud 171. Pivotal about the tube 172 is a sleeve 175 which has a depending finger 176 for engagement with the stud 171 on the opposite side thereof. A torsion spring 177 is coiled about the sleeve 175 being secured at one end to the finger 176 and at the other end to the cap 173.

The housing 165 is provided with a pin 179 that is eccentric to the housing axis and extends between the boss 174 and the finger 176 and is normally restrained therebetween to maintain the nozzle valve in position. In the event, however, that the housing 165 is pivotally displaced, for example, in a clockwise direction as viewed in Figure 7, the pin 179 will angularly displace the finger 176 from its normal position as shown and thereby increase the torsion on the spring 177, as the opposite extremity of the spring is fixed to the cap 173, which remains stationary in contact with the stud 171. A counterclockwise displacement of the housing will displace the cap 173 by means of the boss 174 and similarly increase the spring torsion for the other extremity of the spring is fixed to the finger 176 that remains stationary. Thus the housing is centered by spring loading in both directions.

The center passage 163 of the extension 164 is in continuous communication with a cylindrical chamber 182 of the housing 165, the chamber at its other extremity being normally impeded by a spring-loaded poppet-type valve retained therein by a cap 183. The valve includes a cylindrical nozzle 184 having a large bore partially therethrough terminating at a central orifice 185 (Figure 9), the nozzle being rigidly fixed in alignment with the axis of the chamber 182. Disposed within the confines of the bore of the nozzle 184 is an insert 186 having a plurality of longitudinal slots 187 the length of the insert to communicate the chamber 182 with the orifice 185. The insert is provided with a central bore to accommodate a shaft 188 that is slidable therein but normally restrained in an upward position by means of a compression spring 189 about the shaft and intermediate the insert 186 and a shaft nut 190. Fixed to the lower extremity of the shaft 188 is an annular deflector tip 191 that is adapted to engage the orifice face of the nozzle 184, the contacting surfaces of which are preferably lapped to render a positive seal. Thus when the pressure of the grease within the chamber 182 attains a predetermined value, the shaft 188 will move downward and permit the grease to be exhausted through the slots 187, thence through the orifice 185 and to atmosphere between the surfaces of the nozzle and tip.

Figure 10:
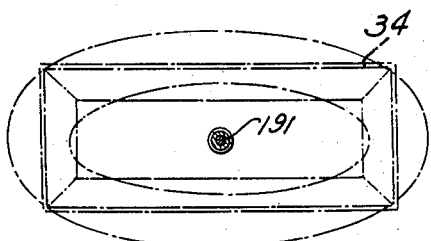
Figure 10 is a top view of a pan showing the grease concentration area after being sprayed.
Figure 9:
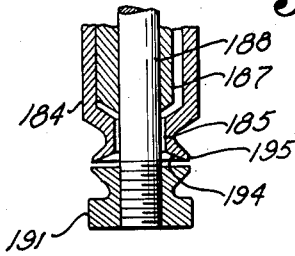
Figure 9 is an enlarged cross sectional view of the discharge end of the nozzle taken on line 9—9 of Figure 8.

Due to the rectangular shape of the pan it has been found desirable to shape the base of the nozzle orifice in order to assure substantially equal deposits of grease upon the inner walls of the pan. Figure 8 shows an exemplary form, greatly enlarged, of an orifice to produce a grease spray represented in Figure 10. It is contemplated that the said orifice may be so contoured to satisfy the requirements of differently dimensioned pans. It is also contemplated that the engaging face of the deflector tip 191 may be contoured to define a predetermined spray pattern. In the represented form, the face of the nozzle 184 is angularly depressed toward and adjacent the orifice 185 along a diameter thereof to form two symmetrically disposed and concave curvilinear surfaces 194 which constitute a major axis of the orifice. The minor axis may or may not be similarly shaped to a lesser extent as required. When the tip 191 is displaced from its normal position, the grease is free to pass to atmosphere under pressure, but due to the shape of the face of the orifice, the major axis has a greater volumetric capacity and greater velocity coefficient. The said capacity and coefficient progressively decrease toward the minor axis. Since the exhaust area is constant between the tip and nozzle peripheries, the grease velocity along the major axis will be comparatively large and progressively decrease toward the minor axis. The grease particles are thus expelled at differential velocities and are directed to be applied in substantially equal quantity upon the inner walls of the pan.

In the absence of further modification, the spray so attained approaches a horizontal line which may be suitable for certain applications. However, in the illustrated embodiment it is desirable to obtain a band of grease of predetermined thickness. Such may be accomplished by providing an acute bevel 195 around the outer periphery of the nozzle base to reduce the eddy losses thereat and effectively alter the direction of flow without materially affecting the velocity. In this manner the grease may be spread to a desired width at the point of interception with the pan walls. It also may be desirable to bevel the peripheral edge of the nozzle to similarly alter the course of the flow of grease. Depending upon the structure desired, the band of grease may be directed above or below the horizontal plane of engagement of the nozzle and tip.

The operation of the hydraulic unit 41 is as follows: When an individual pan reaches a predetermined position upon the frame table 56, the actuator unit 55 operates to open the air valve 57 and admit air pressure into the air cylinder 112. The hydraulic unit 41 is thereby caused to move downward and simultaneously close the circulation check unit 126, thus trapping a portion of the grease between the plunger 146 of the metering cylinder 129 and the ball check valve 122 adjacent the inlet line 47. As the downward motion progresses the plunger 142 of the hydraulic cylinder 141, being in firm abutment with the frame 115, urges the grease out of the passage 140, through the normally open depth check unit 135, to the ante chamber 134 and thence to the tank 40 via the passage 136. When the trigger linkage 155 is actuated by the upper rim of the pan, the depth check unit 135 closes, thereby causing the grease to exert force upon the plunger 146 of the metering cylinder to drive the plunger to its lowermost position as limited by engagement of the stem 149 and the cap 150. The plunger 146, in its downward movement, causes increased pressure upon the grease trapped in the passages on the other side thereof, the flow of which is only releasable through the nozzle unit 116. The increased pressure appears within the chamber 182 of the nozzle unit and urges the nozzle valve to open against the restraint of the compression spring 189 whereby the grease is exhausted through the orifice to spray the inner walls of the pan.

The quantity of grease that is emitted from the nozzle is determined by the initial position of the plunger 146 of the metering cylinder. If a lesser amount is desired, the screw 147 is manually adjusted to locate the plunger in a lower initial position. The lower limit of travel of the hydraulic unit 41 is a variable, depending upon the initial position of the plunger 146, for no exhaust is provided for the grease between the plungers 142 and 146. This is not undesirable for the minute compressibility of the grease cofined serves as a shock absorber for the rapidly moving unit carriage.

The hydraulic unit 41 remains at the lower limit until the air pressure in the cylinder 112 is released through the air valve 57, whereupon the compression spring 114, in addition to other springs that may be utilized, urges the unit to the uppermost position, during which time the circulation check unit 126 and the pan depth check unit 135 will open to permit the passages and chambers to be replenished with grease for the next sequential cycle.

I claim:

1. A spray unit for discharging a lateral spray of grease in a uniform band upon the interior surface of the upright walls of an oblong baking pan, said spray unit comprising a tubular hollow nozzle having an inlet for grease under pressure at one end and provided at its opposite end with an annular end wall having a restricted central outlet passage extending therethrough, said annular end wall having a frustoconically shaped exterior surface flaring outwardly from said outlet passage, a deflector tip carried by said nozzle and having a surface in confronting relation with respect to said first named surface to form a chamber therebetween of progressively diminishing depth radially outward from said outlet passage to the peripheral edge of said frustoconical shaped surface, said deflector tip being movable away from said nozzle to form an annular exhaust slot from said chamber between the said confronting surfaces at the peripheral edge of said frustoconical shaped surface, one of said confronting surfaces having a diametrically extending elongated fusiform depression formed therein terminating short of said exhaust slot, said depression being of progressively decreasing depth radially outward of the axis of said restricted outlet passage, whereby said chamber has a greater volumetric capacity along the major axis of said depression than along the minor axis thereof.

2. A spray unit for discharging a lateral spray of grease in a uniform band upon the interior surface of the upright walls of an oblong baking pan, said spray unit comprising a tubular hollow nozzle provided with an annular end wall having a restricted central outlet passage extending therethrough, and having a frustoconically shaped surface flaring outwardly from said outlet passage, a deflector tip carried by said nozzle, said deflector tip having a surface in confronting relation with respect to said first named surface to form a chamber therebetween of progressively diminishing depth radially outward from said outlet passage, said deflector tip being movable toward said nozzle to seat against the peripheral edge of said frustoconically shaped surface and movable from said nozzle to form an annular exhaust slot between the said confronting surfaces of said nozzle and deflector tip, said frustoconical surface having a diametrically extending elongated fusiform depression formed therein terminating short of said seat, said depression being of progressively decreasing depth radially outward of the axis of said restricted outlet passage, and the width of said depression adjacent the axis of said restricted outlet passage being at least equal to the diameter of said restricted outlet passage, whereby said chamber has a greater volumetric capacity along the major axis of said depression than along the minor axis thereof.

References Cited in the file of this patent

UNITED STATES PATENTS

| | | |
|---|---|---|
| 780,752 | Hill | Jan. 24, 1905 |
| 949,360 | Kinealy | Feb. 19, 1910 |
| 1,404,592 | Freihofer et al. | Jan. 24, 1922 |
| 2,028,798 | Murch | Jan. 28, 1936 |
| 2,446,918 | Goddard | Aug. 10, 1948 |
| 2,539,061 | Coles | Jan. 23, 1951 |
| 2,544,007 | Cook | Mar. 6, 1951 |
| 2,555,803 | Mashinter et al. | June 5, 1951 |
| 2,631,889 | Johnson | Mar. 17, 1953 |
| 2,701,542 | Tench | Feb. 8, 1955 |
| 2,747,539 | Peffer | May 29, 1956 |